United States Patent
Hamagishi et al.

(10) Patent No.: US 7,633,579 B2
(45) Date of Patent: Dec. 15, 2009

(54) DIRECTIONAL DISPLAY DEVICE

(75) Inventors: Goro Hamagishi, Toyonaka (JP); Norio Koma, Kitakata-cho (JP)

(73) Assignee: Seiko Epson Corporation, Tokyo (JP)

( * ) Notice: Subject to any disclaimer, the term of this patent is extended or adjusted under 35 U.S.C. 154(b) by 152 days.

(21) Appl. No.: 12/026,290

(22) Filed: Feb. 5, 2008

(65) Prior Publication Data
US 2008/0192156 A1  Aug. 14, 2008

(30) Foreign Application Priority Data
Feb. 8, 2007  (JP) ............................. 2007-029123

(51) Int. Cl.
G02F 1/1335  (2006.01)
(52) U.S. Cl. ...................................... 349/71
(58) Field of Classification Search .................... 349/71
See application file for complete search history.

(56) References Cited

U.S. PATENT DOCUMENTS

| 7,518,664 | B2 * | 4/2009 | Mather et al. ................. 349/15 |
| 2003/0214227 | A1 | 11/2003 | Tsuchiya |
| 2006/0170833 | A1 | 8/2006 | Lin et al. |
| 2006/0274226 | A1 * | 12/2006 | Im et al. ....................... 349/71 |

FOREIGN PATENT DOCUMENTS

| EP | 1724631 A1 | 11/2006 |
| GB | 2428129 A | 1/2007 |
| JP | 2005-181668 | 7/2005 |
| JP | 2006-156751 | 6/2006 |
| JP | 2006-184876 | 7/2006 |

OTHER PUBLICATIONS

Yamamoto, et al; Stereoscopic Full-color Light Emitting Diode Display Using Parallax Barrier for Different Interpupillary Distances; Optical Review vol. 9, No. 6 (2002) pp. 244-250.

* cited by examiner

Primary Examiner—David Nelms
Assistant Examiner—Phu Vu
(74) Attorney, Agent, or Firm—Workman Nydegger

(57) ABSTRACT

A directional display device configured to display a plurality of directional images simultaneously is provided. The directional display device includes a liquid crystal panel having a liquid crystal layer and a light reflecting membrane arranged behind the liquid crystal layer. The liquid crystal panel is configured to form the plurality of images by using a plurality of pixel dots. The directional display device includes a barrier portion arranged in front of the liquid crystal panel. The barrier portion has a plurality of light shields and a plurality of apertures. Each of the apertures is arranged in such a way that one of the apertures is associated with n (an integer being no less than two) pixel dots if n images are displayed. Each of the light shields has behind thereof a luminescent layer for illuminating the liquid crystal panel.

5 Claims, 4 Drawing Sheets

DIRECTIONAL DISPLAY DEVICE

BACKGROUND

1. Technical Field

The present invention relates to a directional display device configured to display plural directional images simultaneously, such as a two-image display or a three-dimensional (3D) display.

2. Related Art

As disclosed in JP-A-2005-181668, e.g., a directional display device such as a 3D display has a barrier arranged in front of a transparent liquid crystal panel so as to divide an image into plural directional images. By partially cutting off light of the image emitted from the transparent liquid crystal panel, the barrier divides the image into the plural directional images. Therefore, if being viewed by an observer, the plural images look darker than a usually displayed one image and poor visibility is thereby caused.

In addition, as the transparent liquid crystal panel has poorer visibility under external light than a reflective liquid crystal panel, there is a problem that the directional display device using the transparent liquid crystal panel having the above characteristic has even poorer visibility under strong external light such as sunlight.

SUMMARY

An advantage of some aspects of the invention is that it solves the problems described above, and provides a directional display device having visibility that is not degraded under strong external light.

According to an aspect of the invention, a directional display device configured to display a plurality of directional images simultaneously is provided. The directional display device includes a reflective liquid crystal display panel having a liquid crystal layer and a light reflecting membrane arranged behind the liquid crystal layer. The reflective liquid crystal display panel is configured to form the plurality of images by using a plurality of pixel dots. The directional display device includes a barrier arranged in front of the reflective liquid crystal display panel. The barrier has a plurality of light shields and a plurality of apertures. Each of the apertures is arranged in such a way that one of the apertures is associated with n (an integer being no less than two) pixel dots if n images are displayed. Each of the light shields has, behind thereof, a luminescent layer for illuminating the reflective liquid crystal display panel.

As described above, the directional display device of the invention uses as a display panel a liquid crystal panel which has better visibility under external light than a transparent liquid crystal panel. Thus, the visibility of the directional display device of the invention is not degraded even under strong external light such as sunlight. Besides, each of the apertures of the barrier is arranged in such a way that one of the apertures is associated with n pixel dots, where n is an integer no less than two. Thus, n images formed by the liquid crystal panel may be optically separated. Further, each of the light shields of the barrier has, behind thereof, a luminescent layer. Thus, even under weak or no external light, visibility of the images is not degraded as these luminescent layers illuminate the liquid crystal panel.

It is preferable that each of the light shields of the barrier of the directional display device of the invention has, in front thereof, a non-reflective layer.

As the barrier negligibly reflects external light therefrom, screen reflection from external light sources may be prevented.

In a case where a pitch of any adjacent two of the apertures of the barrier of the directional display device of the invention is denoted by L, and a pitch of any adjacent two of a plurality of pixel dots of the liquid crystal panel configured to form an image is denoted by M, it is preferable that the pitch denoted by L is smaller than the pitch denoted by M.

According to the above configuration, n images formed by the liquid crystal panel may be efficiently separated.

The light shields and the apertures of the barrier of the directional display device of the invention may be arranged to form a checkerboard pattern or to form stripes.

According to an above arrangement, quality of each of displayed images may be improved.

The invention is not limited to an invention of a device, but may be an invention of a method such as a method for displaying an image.

BRIEF DESCRIPTION OF THE DRAWINGS

The invention will be described with reference to the accompanying drawings, wherein like numbers reference like elements.

DESCRIPTION OF EXEMPLARY EMBODIMENTS

A. Configuration of the Embodiment

Figure 1:
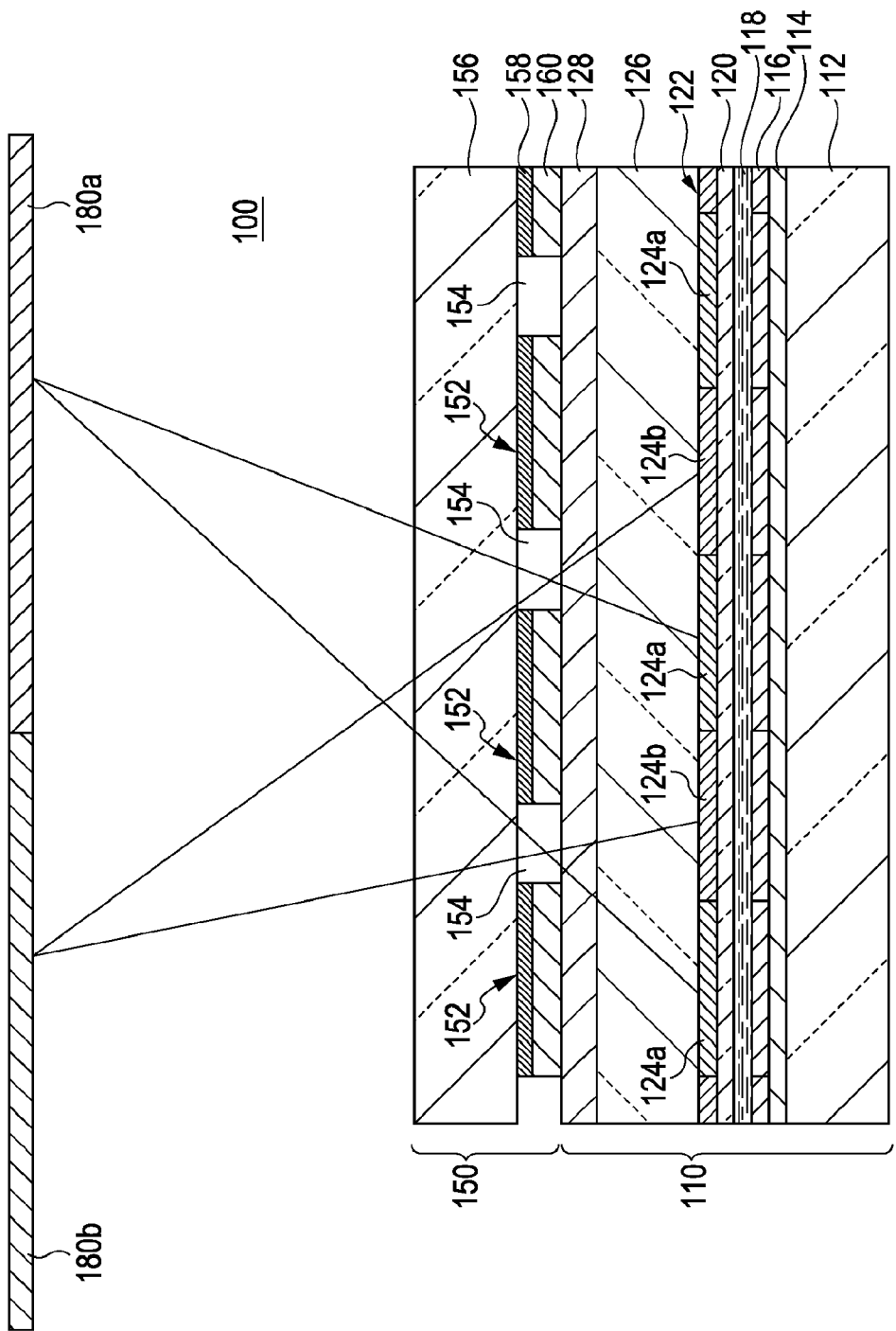
FIG. 1 is an explanatory diagram of a directional display of an embodiment of the invention showing a section of the directional display as an explanatory model.

FIG. 1 is an explanatory diagram of a directional display of an embodiment of the invention showing a section of the directional display as an explanatory model. A directional display 100 of the embodiment is a two-image display or a three-dimensional (3D) display configured to display two images (a first image and a second image) simultaneously. As shown in FIG. 1, the directional display 100 of the embodiment has a liquid crystal panel (RLC panel) 110 and a barrier 150 arranged in front of the RLC panel 110.

The directional display 100 corresponds to a directional display device. The RLC panel 110 corresponds to a liquid crystal panel. The barrier 150 corresponds to a barrier portion.

The RLC panel 110 includes a glass substrate 112 and a light reflecting membrane 114 formed on the glass substrate 112. It is preferable that the light reflecting membrane 114 has, on a surface thereof, a fine degree of unevenness so as to diffuse reflected light. On the light reflecting membrane 114, a plurality of transparent pixel electrodes 116 are formed each of which is associated with a corresponding one of a plurality of pixel dots. Between the glass substrate 112 and the light reflecting membrane 114, a plurality of thin film transistors (TFTs) for switching the pixel dots are arranged but not shown in FIG. 1, wherein each of the TFTs is associated with a corresponding one of the pixel electrodes 116.

In front of the pixel electrodes 116, a liquid crystal layer 118 is formed. In front of the liquid crystal layer 118, a transparent opposite electrode 120 is formed. In front of the opposite electrode 120, a color filter 122 consisting of three colors, i.e., red (R), blue (B) and green (G), is formed. It is preferable that a black matrix is formed at a border of a region of each of the colors. In front of the color filter 122, a glass substrate 126 is arranged. In front of the glass substrate 126, a polarizing plate 128 is formed.

The RLC panel 110 may form two images (a first image and a second image) by using the plural pixel dots. Each one of the pixel dots mainly includes the single pixel electrode 116, a portion of the opposite electrode 120 facing the pixel electrode 116, a portion of the liquid crystal layer 118 placed between those electrodes, and a portion of the color filter 122 facing the pixel electrode 116 over the opposite electrode 120. The plural pixel dots are divided into first pixel dots 124a and second pixel dots 124b. The first pixel dots 124a and the second pixel dots 124b are alternately arranged as shown in FIG. 1.

The barrier 150, meanwhile, is formed by a plurality of light shields 152 and a plurality of apertures 154 which are alternately arranged along an in-plane direction. The light shield 152 is configured by a black-colored non-reflective layer 158 composed of chromium oxide and formed behind a glass substrate 156, and by a luminescent layer 160 composed of an organic electroluminescent material and formed behind the non-reflective layer 158. In this configuration, a pair of electrodes for supplying the luminescent layer 160 with power is arranged but is not shown.

Each of the apertures 154 of the barrier 150 of the embodiment is arranged in such a way that one of the apertures is associated with an adjacent two of the pixel dots (i.e., one of the first pixel dots 124a and one of the second pixel dots 124b that are adjacent to each other). The two images (the first image and the second image) formed by the RLC panel 110 may be optically separated thereby. Then, the first image formed by the first pixel dots 124a may be observed from a first observation area 180a in front of the directional display 100, and the second image formed by the second pixel dots 124b may be observed from a second observation area 180b in front of the directional display 100.

B. Operation of the Embodiment

If the directional display 100 shown in FIG. 1 is activated, the luminescent layer 160 formed behind each of the light shields 152 emits light and illuminates the RLC panel 110 from a front side thereof.

If an image signal (not shown) is then provided to the directional display 100 from outside, in the RLC panel 110 a desired voltage is applied between each of the pixel electrodes 116 and the opposite electrode 120, and the liquid crystal layer 118 placed between the pixel electrode 116 and the opposite electrode 120 is driven on the basis of the image signal. The first image and the second image are formed thereby on the plural first pixel dots 124a and on the plural second pixel dots 124b, respectively.

If the directional display 100 is illuminated by external light from a front side thereof on this occasion, the light reaches the light shield 152 or the aperture 154 through the glass substrate 156 within the barrier 150. As the non-reflective layer 158 forms the front side of the light shield 152, most of the light that reaches the light shield 152 is absorbed and not reflected. The light that reaches the aperture 154 passes inside the aperture 154 and enters the RLC panel 110.

In addition, as the luminescent layer 160 placed behind the light shield 152 emits light and illuminates the RLC panel 110 as described earlier, the light from the luminescent layer 160 also enters the RLC panel 110. Even in a case where there is no external light mentioned above and no external light enters the RLC panel 110, the light from the luminescent layer 160 always enters the RLC panel 110.

After passing through the polarizing plate 128 and the glass substrate 126, then, the light that enters the RLC panel 110 passes through the opposite electrode 120, the liquid crystal layer 118 and the pixel electrode 116 in this order, and reaches the light reflecting membrane 114. The light reflecting membrane 114 reflects the light that has reached thereto. The reflected light travels in the RLC panel 110 in a direction opposite to that mentioned above, and reaches the barrier 150. Meanwhile, the light is modulated according to the above image signal by passing through the liquid crystal layer 118 driven by the electrodes 116 and 120. Further, the light is converted to each of the colors R, G and B by passing through the color filter 122. The light passing through the RLC panel 110, modulated according to the image signal and converted to each of the colors R, G and B consequently forms a color image.

As it is shielded by the light shield 152, the light that has reached the light shield 152, i.e., a portion of the light that has reached the barrier 150, is not emitted from the RLC panel 110. The light that has reached the aperture 154, meanwhile, is emitted from the RLC panel 110 after passing inside the aperture 154 and through the glass substrate 156. That is, only the light that has passed through the aperture 154 may reach the first observation area 180a or the second observation area 180b.

As described earlier, each of the apertures 154 is arranged in such a way that one of the apertures is associated with one of the first pixel dots 124a and one of the second pixel dots 124b that are adjacent to each other. Thus, as shown in FIG. 1, every light ray included in the light that has passed through each of the apertures 154 and having started from one of the first pixel dots 124a reaches the first observation area 180a, and every light ray included in the light that has passed through the aperture 154 and having started from one of the second pixel dots 124b reaches the second observation area 180b.

As each of the first image formed by the first pixel dots 124a and the second image formed by the second pixel dots 124b is made directional and optically separated thereby, an observer (not shown) may observe the colored first image and the colored second image in the first observation area 180a and in the second observation area 180b, respectively.

As described above, the directional display 100 of the embodiment uses the RLC panel 110 as a display panel. As the RLC panel 110 has better visibility under external light than a transparent liquid crystal panel, the visibility of the directional display 100 of the embodiment is not degraded even under strong external light such as sunlight by using the RLC panel 110. In case of using external light and the light from the luminescent layer 160 as light sources, the directional display 100 may reduce power provided to and consumed by the luminescent layer 160 by making use of external light for displaying an image.

And each of the apertures 154 of the barrier 150 is arranged in such a way that one of the apertures is associated with an adjacent two of the pixel dots (i.e., one of the first pixel dots 124a and one of the second pixel dots 124b that are adjacent to each other). Thus, the two images (the first image and the second image) formed by the RLC panel 110 may be optically separated.

Further, each of the light shields 152 of the barrier 150 has, behind thereof, the luminescent layer 160 composed of an organic electroluminescent material. Thus, even in a case where there is weak or no external light, the visibility of the images is not degraded as these luminescent layers 160 illuminate the RLC panel 110.

In addition, each of the light shields 152 of the barrier 150 has, in front thereof, the black-colored non-reflective layer 158. Thus, as the barrier 150 negligibly reflects external light, screen reflection from external light sources may be prevented.

C. How to Determine Dimensions

Next, a method for determining a gap between the luminescent layer 160 and the pixel dot, and for determining a pitch of any adjacent two of the apertures 154 of the barrier 150 of the embodiment will be explained. Each of FIG. 2 and FIG. 3 is a diagram for explaining the method for determining the gap and the pitch.

Figure 2:
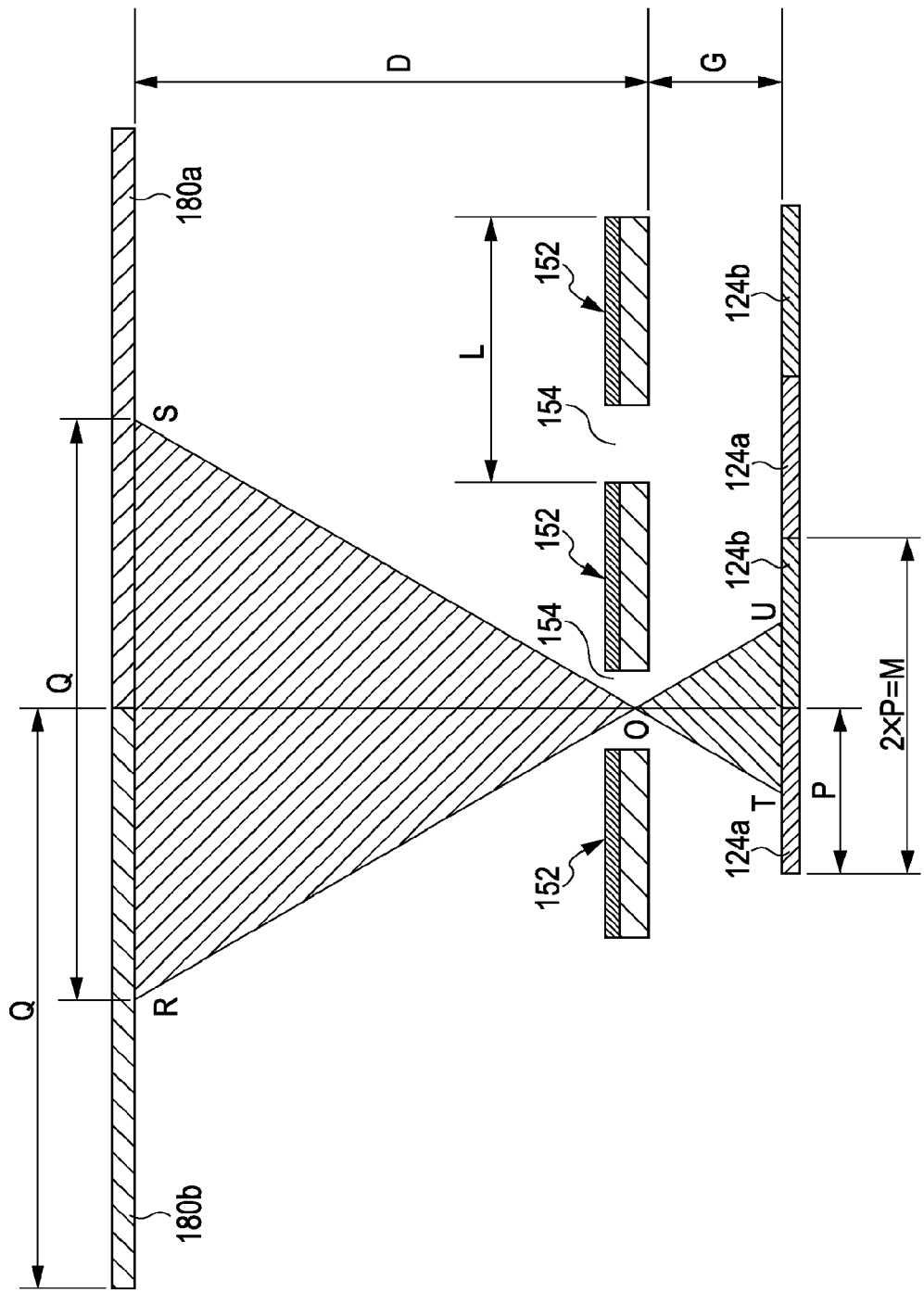
FIG. 2 is a diagram for explaining a method for determining some of dimensions of the directional display of the embodiment.
Figure 3:
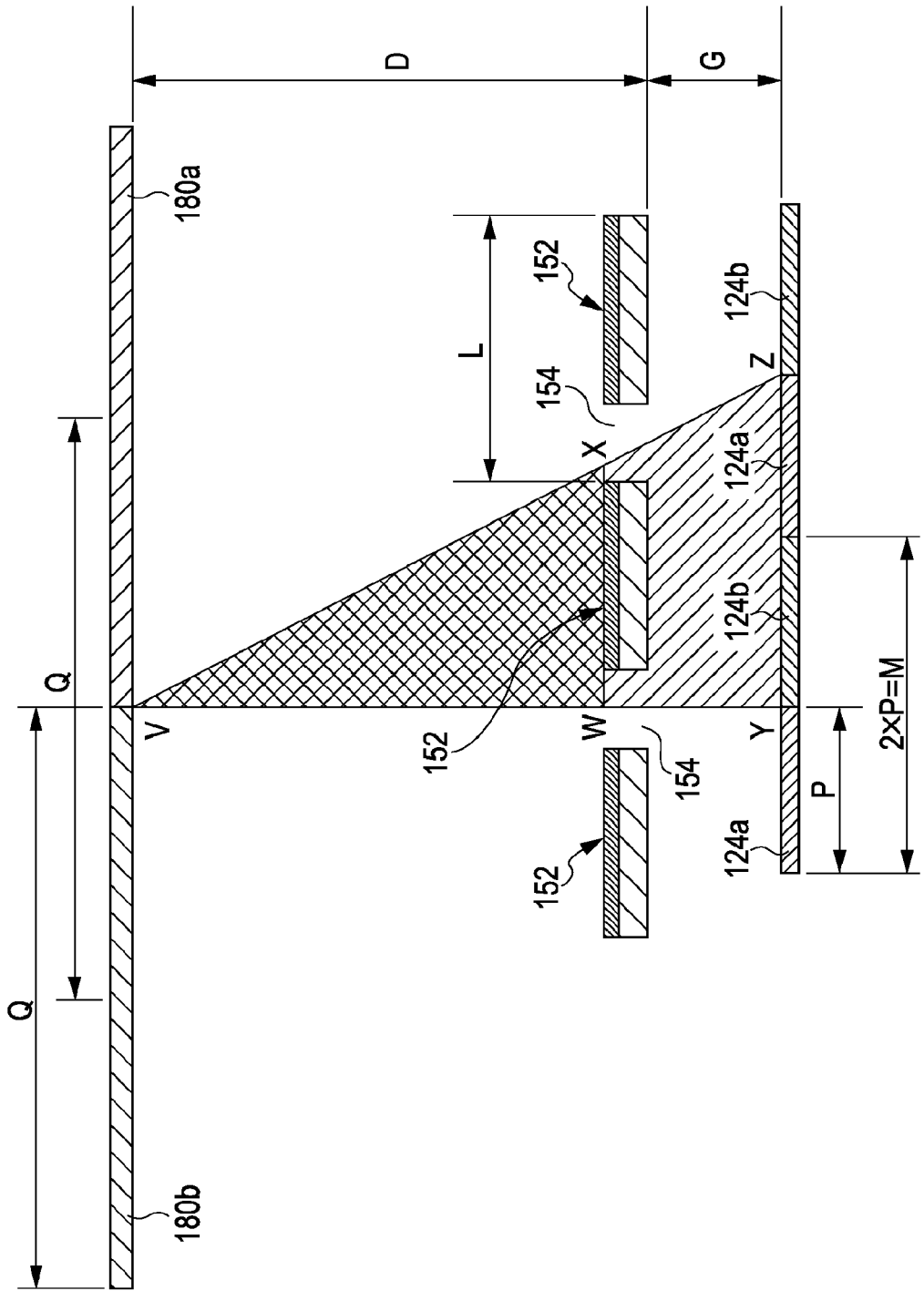
FIG. 3 is another diagram for explaining the method for determining some of dimensions of the directional display of the embodiment.

In FIG. 2 and FIG. 3, Q denotes a range where a separated image normally reaches, and more specifically, a normal range where the separated image reaches an observer (not shown) under proper display conditions. D denotes an observation distance, and more specifically, a distance normally assumed from the directional display 100 to the observer. G denotes a gap between the luminescent layer 160 of the barrier 150 and the pixel dot of the RLC panel 110. L denotes a pitch of any adjacent two of the apertures 154 of the barrier 150. M denotes a pitch of any adjacent two of the first pixel dots 124a and the second pixel dots 124b of the RLC panel 110. P denotes a width of the pixel dot, and a value of M is twice as large as a value of P in the embodiment (2×P=M).

Among the above dimensions, each of Q, D and M (=2×P) is given a value in advance, and values of G and L will be determined on the basis of the values of Q, D and M.

At first in FIG. 2, a light ray emitted from a point T in the first pixel dot 124a passes through a point O in the aperture 154 and reaches a point S in the first observation area 180a. A light ray emitted from a point U in the second pixel dot 124b, meanwhile, intersects with the light ray emitted from the point T at the point O in the aperture 154 and reaches a point R in the second observation area 180b.

Then, in FIG. 2, considering a triangle OSR existing between the aperture 154 and the observer, and a triangle OTU existing between the aperture 154 and the pixel dots, as the above triangles are similar, equation (1) is obtained.

$$Q/P = D/G \qquad (1),$$

where P=M/2.

Next, in FIG. 3, a light ray emitted from a point Y, which is a central point of the RLC panel 110 and on a border between the first pixel dot 124a and the second pixel dot 124b, passes through a point W in one of the apertures 154 and reaches a point V on a border between the first observation area 180a and the second observation area 180b. A light ray emitted from a point Z on another border between the first pixel dot 124a and the second pixel dot 124b, meanwhile, passes through a point X in another one of the apertures 154 and reaches the point V on the border between the first observation area 180a and the second observation area 180b.

Then, in FIG. 3, considering a triangle VWX existing between the observer and the apertures 154, and a triangle VYZ existing between the observer and the pixel dots, as the above triangles are similar, equation (2) is obtained.

$$M/(D+G) = L/D \qquad (2)$$

Thus, each of the values of G and L may be looked for and determined by solving the simultaneous equations (1) and (2).

Incidentally, in a case where each of the values of G and L is determined and the value of L (i.e., the pitch of any adjacent two of the apertures 154 of the barrier 150) is compared to the value of M (i.e., the pitch of any adjacent two of the first pixel dots 124a and the second pixel dots 124b of the RLC panel 110), the value of L is smaller than the value of M according to equation (2). Thus, the two images formed by the RLC panel 110 (the first image and the second image) may be efficiently separated.

If the values of L and M were equal to each other, there would be an overlap between the first observation area 180a and the second observation area 180b on a side of the observer, and thus the first image and the second image would not be able to be efficiently separated.

The values of G and L may be determined as described above. Besides, in a case where the directional display 100 of the embodiment is used as a two-image display, it is preferable that a thickness of the glass substrate 126 and a thickness of the polarizing plate 128 are reduced. That is because it is desirable to make an angle of a light ray emitted from the pixel dot to the aperture 154 (an angle to a face of emission) as small as possible for the two-image display so that the observation areas 180a and 180b may be broadened in comparison with the case of the 3D display.

D. Specific Examples of the Barrier

Figure 4:
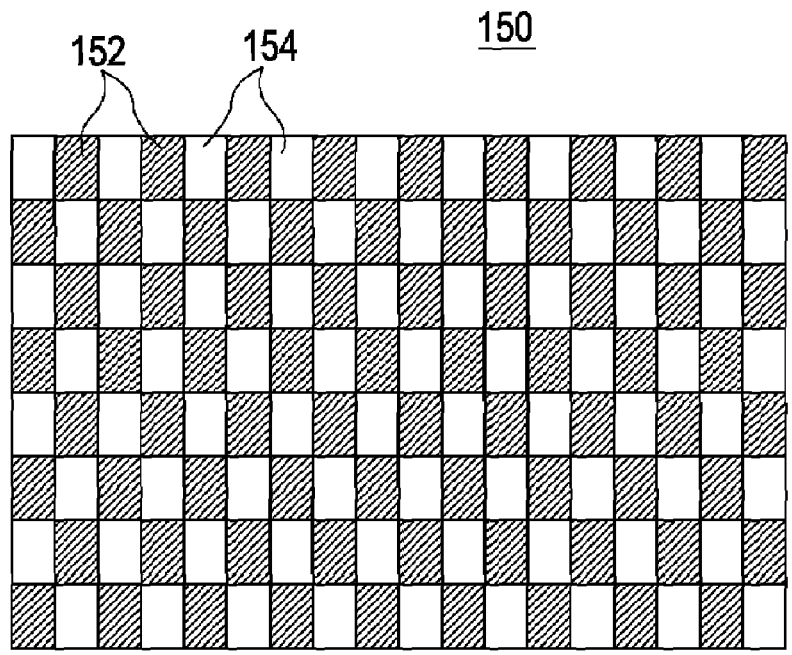
FIG. 4 is an explanatory diagram showing a specific example of a barrier of the directional display of the embodiment as viewed by an observer.
Figure 5:
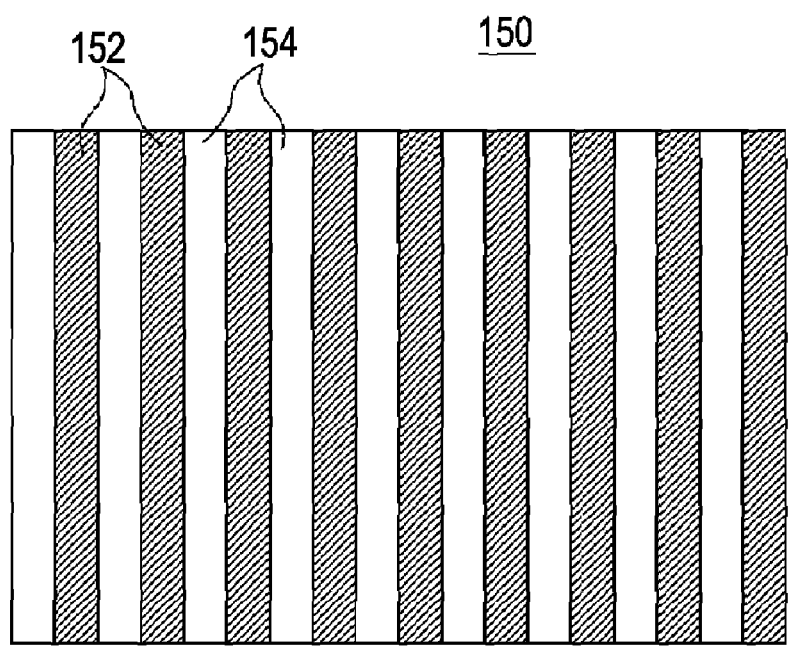
FIG. 5 is another explanatory diagram showing another specific example of the barrier of the directional display of the embodiment as viewed by the observer.

The light shields 152 and the apertures 154 of the barrier 150 may be arranged, although not particularly mentioned in the above description, specifically as shown in FIG. 4 or FIG. 5. FIG. 4 is an explanatory diagram showing a specific example of the barrier 150 shown in FIG. 1 as viewed by the observer. FIG. 5 is another explanatory diagram showing another specific example of the barrier 150 shown in FIG. 1 as viewed by the observer.

The plural light shields 152 and the plural apertures 154 of the barrier 150 are alternately arranged along the in-plane direction as described earlier, and more specifically, may be alternately arranged to form a checkerboard pattern as shown in FIG. 4, or may be alternately arranged to form stripes as shown in FIG. 5. By means of these arrangements, quality of each of the first image and the second image may be improved.

E. Modifications

The invention is not limited to the above examples or the embodiment, but may be variously modified within the scope of the invention.

The luminescent layer 160 of the barrier 150 of the embodiment described above is composed of an organic electroluminescent material. As the invention is not limited to the above embodiment, the luminescent layer 160 may be composed of an inorganic electroluminescent material or light emitting diodes (LEDs).

The directional display 100 of the embodiment described above is a two-image display configured to display two images simultaneously or a 3D display to which the invention is applied. The invention is not limited to the above embodiment, but may be applied to, e.g., an n-image display configured to display n images simultaneously (n is an integer which is no less than three).

On this occasion, each of the apertures 154 of the barrier 150 is arranged in such a way that one of the apertures is associated with n pixel dots of the RLC panel 110. The n images formed by the RLC panel 110 may be optically separated thereby.

The entire disclosure of Japanese Patent Application No: 2007-029123, filed Feb. 8, 2007 is expressly incorporated by reference herein.

What is claimed is:

1. A directional display device configured to display a plurality of directional images simultaneously, comprising:
   a liquid crystal panel having a liquid crystal layer and a light reflecting membrane arranged behind the liquid crystal layer, the liquid crystal panel configured to form the plurality of images by using a plurality of pixel dots; and
   a barrier portion arranged in front of the liquid crystal panel, the barrier portion having a plurality of light shields and a plurality of apertures, each of the apertures arranged in such a way that one of the apertures is associated with n (an integer being no less than two) pixel dots if n images are displayed, each of the light shields having behind thereof a luminescent layer for illuminating the liquid crystal panel.

2. The directional display device according to claim 1, wherein each of the light shields has in front thereof a non-reflective layer.

3. The directional display device according to claim 1, wherein a pitch of any adjacent two of the apertures of the barrier portion is denoted by L, a pitch of any adjacent two of the plurality of pixel dots of the liquid crystal panel configured to form an image is denoted by M, and the pitch denoted by L is smaller than the pitch denoted by M.

4. The directional display device according to claim 1, wherein the light shields and the apertures of the barrier portion are arranged to form a checkerboard pattern.

5. The directional display device according to claim 1, wherein the light shields and the apertures of the barrier portion are arranged to form a plurality of stripes.

* * * * *